L. R. FOGG.
GREASE CUP.
APPLICATION FILED FEB. 14, 1920.

1,361,844.

Patented Dec. 14, 1920.

Inventor:
Lester R. Fogg.
by his atty

UNITED STATES PATENT OFFICE.

LESTER RAYMOND FOGG, OF QUINCY, MASSACHUSETTS.

GREASE-CUP.

1,361,844. Specification of Letters Patent. Patented Dec. 14, 1920.

Application filed February 14, 1920. Serial No. 358,796.

*To all whom it may concern:*

Be it known that I, LESTER R. FOGG, a citizen of the United States, residing at Quincy, in the county of Norfolk and State of Massachusetts, have invented new and useful Improvements in Grease-Cups, of which the following is a specification.

This invention relates to improvements in grease cups.

It is an object of the invention to provide a grease cup which will be non-leakable and which may be filled with grease and manipulated to feed said grease without soiling the hands and without the danger of mixing dirt with said grease, by virtue of the fact that the absence of grease upon the outside of the device eliminates to a great extent, the tendency of the dust and grit to stick thereto and accidentally get into the cup while refilling.

It is also an object of the invention to so construct the device that when the same is filled with grease the cover may be attached and locked in position and the grease fed as desired by rotating all the necessary parts in a similar direction, and when the cup requires refilling the said parts may all be rotated in a reverse direction in order that the device may be opened and the cup refilled.

It is still further an object of the invention to so join the various parts that have screw threaded engagement with each other together, that said parts can not become separated during the ordinary operation of the device, thereby eliminating the possibility of cross-threading and also of mutilating the threads because of carelessness or haste in assembling.

The invention consists in the combination and arrangement of parts whereby the above objects and certain other objects hereinafter appearing may be attained as set forth in the following specification and particularly pointed out in the claims thereof.

Referring to the drawings.

Like numerals refer to like parts throughout the several views of the drawings.

Figure 1:
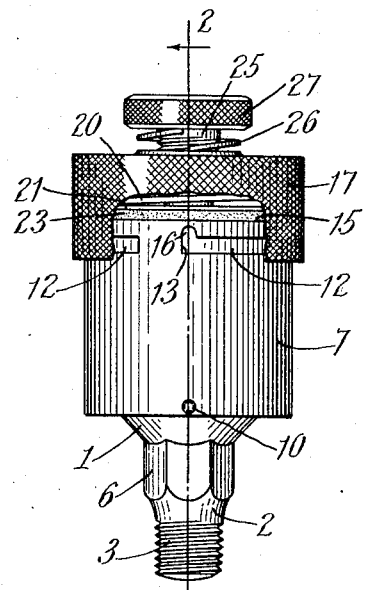
Figure 1 is a side elevation of a grease cup embodying my invention, a portion of the cover thereof being broken away to more clearly illustrate portions of the device therebehind.
Figure 2:
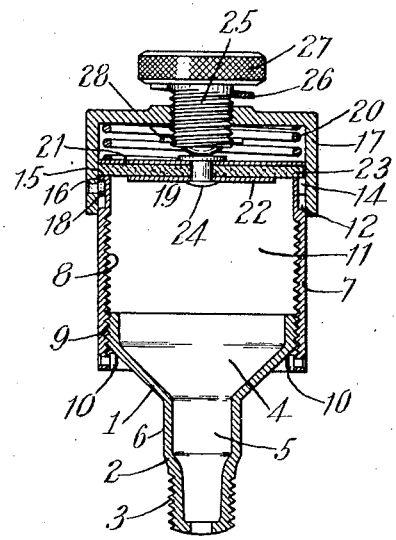
Fig. 2 is a vertical section as taken on the line 2—2 of Fig. 1.
Figure 3:
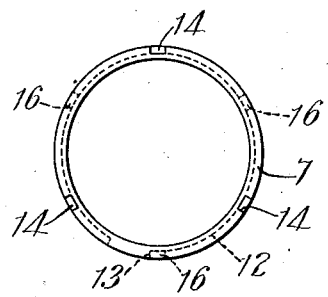
Fig. 3 is a plan view of the cylindrical casing.
Figure 5:
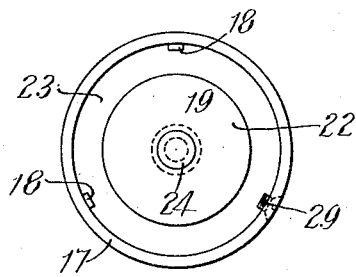
Fig. 5 is an underneath plan view of the cover together with the various parts mounted thereon.
Figure 4:
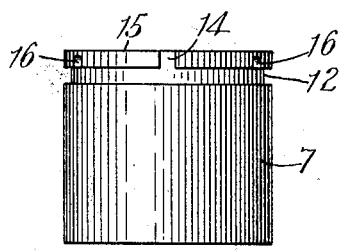
Fig. 4 is a side elevation of the cylindrical casing as viewed from the rear of Fig. 1.

In the drawings, 1 represents a stationary member which is provided with a downwardly extending stem 2 adapted to be attached by means of a threaded portion 3 to any device requiring lubrication. The stationary member 1 is provided at its upper end with a cup-shaped cavity 4 which has an outlet passage 5 leading therefrom and extending downwardly through the stem 2. The stem 2 is also provided with a hexagonal portion 6 which may be engaged by a wrench when attaching or removing the grease cup from any device to which it may be secured.

Rotatably mounted upon the upper portion of the stationary member 1 is a cylindrical casing 7 which constitutes the main body portion of the grease cup. The interior of the cylindrical casing 7 is screw threaded at 8 to fit a corresponding screw thread 9 provided upon the exterior of the upper portion of the stationary member 1. After the cylindrical casing 7 has been attached to the stationary member 1 a plurality of pins 10 are inserted in said casing at the lower end thereof, the said pins projecting inwardly a sufficient distance to engage the stationary member 1 and thereafter prevent said casing 7 and stationary member 1 from becoming detached from each other. The interior of the casing 7 coöperates with the cavity 4 of the stationary member 1 in forming a grease chamber 11.

Formed in the periphery of the casing 7 near the upper end thereof is a groove 12 which extends nearly around the circumference thereof, one end of said groove constituting a stop 13. A plurality of short vertical grooves 14 extend from a top edge 15 of the casing 7 downwardly and connect with the circumferential groove 12. Formed in the upper edge of the circumferential groove 12 are a plurality of small recesses 16, one of said recesses being adjacent to the stop 13 at the end of said groove.

A cover 17 is adapted to be attached to the casing 7 and entirely inclose the upper end thereof. A plurality of pins 18 and a small screw 29 are fast to the cover 17 and project inwardly a short distance therefrom. The pins 18 and screw 29 are furthermore spaced to register with the vertical grooves 14 and recesses 16 of the casing 7. Located within the cover 17 is an auxiliary cover 19 which, when the cover 17 is detached from the casing 7, is forced by a spring 20 against the upper side of the pins 18 and screw 29 which act as stops to retain said auxiliary cover within said cover. The pins 18 are permanently attached to the cover 17; the screw 29, however, may be removed from said cover and when so removed makes it possible for the auxiliary cover 19 and spring 20 to be removed from within said cover. The auxiliary cover 19 consists of an upper disk 21 and a lower disk 22, of shorter diameter within the disk 21, between which is inserted a layer of flexible material 23 composed of cork or other suitable substance which will not deteriorate from contact with grease. The disks 21 and 22 and layer 23 are firmly secured together by a centrally located rivet 24.

The cover 17 is attached to the casing 7 by alining the pins 18 and screw 29 with the grooves 14 and then forcing the cover downwardly, the auxiliary cover 19 yielding as it engages the top edge 15 of the casing 7. As the auxiliary cover yields, the pins 18 and screw 29 will pass downwardly through the grooves 14 until they contact with the bottom edge of the circumferential groove 12, whereupon the cover 17 is rotated toward the right, the pins 18 and screw 29 traveling along the groove 12 until one of said pins or the screw 29 engages the stop 13 whereupon all of the pins 18 and the screw 29 will register with the recesses 16 and will be forced upwardly therein by the pressure of the auxiliary cover 19 against the top edge 15 of the casing 7.

The cover 17 may now be locked in this position by means of a thumb-screw 25 which is centrally located in said cover and which may be rotated until it engages the rivet 24 of the auxiliary cover 19 thereby forcing the layer of cork 23 against the top edge 15 of the cylindrical casing 7 and also preventing the auxiliary cover from yielding when pressure is applied downwardly to said cover and thereby preventing the pins 18 and screw 29 from becoming disengaged from their respective recesses 16.

A spring washer 26 is inserted between the top of the cover 17 and head 27 of the thumb-screw 25 and is adapted to increase the friction between said parts and prevent the screw 25 from loosening when the cover 17 is locked in position upon the casing 7. The thumb-screw 25 is prevented from becoming detached from the cover 17 by a pin 28 which extends through said screw and engages the underside of the cover 17. The periphery of the head 27 of the thumb-screw 25 and also the periphery of the cover 17 are preferably knurled to facilitate the handling thereof.

The operation of my improved grease cup is as follows:

When it is desired to fill the cup with grease, the cover 17 which is securely locked to the casing 7 by the screw 25, is grasped and rotated toward the left until the pins 10 at the lower end of the casing 7 engage the underside of the stationary member 1 and prevent further rotation of said casing. The thumb-screw 25 is then rotated toward the left until it also is prevented from rotating by the pin 28 contacting with the underside of the cover 17. The cover 17 is then pressed downwardly and the auxiliary cover 19 which is now being pressed against the top edge 15 of the casing 7 by the spring 20, will yield against the tension of said spring allowing the pins 18 and screw 29 to be disengaged from the recesses 16, whereupon the cover 17 may be rotated toward the left until the pins 18 and screw 29 aline with the grooves 14 thereby allowing said cover to be lifted away from the casing 7.

After inserting grease within the chamber 11 the cover is again applied to the casing 7 by alining the pins 18 and screw 29 with the slots 14 and forcing said cover downwardly against the tension of the spring 20 until said pins and screw contact with the bottom edge of the circumferential groove 12. The cover is then rotated toward the right until one of the pins 18 or the screw 29 engages the stop 13 whereupon the said pins and screw are forced into the recesses 16. The thumb-screw 25 is then rotated toward the right until it contacts with the auxiliary cover 19 and forces the same against the top edge 15 of the casing 7 thereby simultaneously locking the cover 17 to the casing 7 and also positively closing the opening at the upper end of the casing 7 and preventing any grease from escaping therefrom. A further attempt to rotate the screw 25 toward the right will now rotate the cover 17 and casing 7 in unison thereby forcing the grease downwardly from the chamber 11 through the passage 5. It will be noted that in opening the grease cup preparatory to filling, the various parts are all rotated toward the left and in closing the cup and feeding the grease the parts are all rotated toward the right. This simplifies and quickens each operation. During the normal operation of the device it is impossible to separate any parts which have screw threaded engagement with each other, thereby preventing cross-threading and eliminating any difficulty in properly uniting the various parts.

Having thus described my invention, what I claim and desire by Letters Patent to secure is:

1. A grease cup having, in combination, a stationary member, a casing rotatably mounted upon said stationary member and provided with an opening through each end thereof, the lower end of said casing being closed by said stationary member, a cover rotatably mounted upon said casing, an auxiliary cover located within said cover, means to yieldingly force said auxiliary cover against the upper end of said casing, and means to lock said cover to said casing.

2. A grease cup having, in combination, a stationary member, a casing rotatably mounted upon said stationary member and provided with an opening through each end thereof, the lower end of said casing being closed by said stationary member, a cover rotatably mounted upon said casing, an auxiliary cover located within said cover and a spring adapted to yieldingly force said auxiliary cover against the upper end of said casing and close the opening therethrough.

3. A grease cup having, in combination, a stationary member, a casing rotatably mounted upon said stationary member and provided with an opening through each end thereof, the lower end of said casing being closed by said stationary member, a cover rotatably mounted upon said casing, means to secure said cover to said casing, and an auxiliary cover located within said cover and adapted to yieldingly engage said casing and simultaneously close the opening through the upper end thereof and prevent the rotation of said cover upon said casing.

4. A grease cup having, in combination, a stationary member, a casing rotatably mounted upon said stationary member and provided with an opening through each end thereof, the lower end of said casing being closed by said stationary member, a cover rotatably mounted upon said casing, a plurality of pins attached to said cover, an auxiliary cover located within said cover and adapted to yieldingly engage said casing and simultaneously close the opening through the upper end thereof and prevent the rotation of said cover upon said casing, and means to lock said cover to said casing.

5. A grease cup having, in combination, a stationary member, a casing rotatably mounted upon said stationary member and provided with an opening through each end thereof, the lower end of said casing being closed by said stationary member, a cover rotatably mounted upon said casing, means to secure said cover to said casing, an auxiliary cover located within said cover and adapted to yieldingly engage said casing and simultaneously close the opening through the upper end thereof and prevent the rotation of said cover upon said casing, and means to simultaneously lock said cover to said casing and force said auxiliary cover against the upper end of said casing.

6. A grease cup having, in combination, a stationary member, a casing rotatably mounted upon said stationary member, a cover rotatably mounted upon said casing, an auxiliary cover located within said cover, means to secure said cover to said casing, and a screw rotatably mounted in said cover and adapted to engage said auxiliary cover and force said cover into locking engagement with said casing.

7. A grease cup having, in combination, a stationary member, a casing rotatably mounted upon said stationary member, a cover rotatably mounted upon said casing, an auxiliary cover located within said cover, means to secure said cover to said casing and a screw rotatably mounted in said cover and adapted to engage said auxiliary cover and force said cover into locking engagement with said casing, said screw, cover and casing all being rotatable in the same direction to open said grease cup and position the same for filling with grease.

8. A grease cup having, in combination, a stationary member, a casing rotatably mounted upon said stationary member, a cover rotatably mounted upon said casing, an auxiliary cover located within said cover, means to secure said cover to said casing, and a screw rotatably mounted in said cover and adapted to force said cover into locking engagement with said casing, said screw, cover and casing all being rotatable in the same direction to open said grease cup and position the same for filling with grease, and likewise rotatable in a reverse direction to close said casing when filled and to thereafter feed said grease.

9. A grease cup having, in combination, a stationary member, a casing rotatably mounted upon said stationary member and permanently attached thereto, a cover rotatably mounted upon said casing, an auxiliary cover located within said casing, means to secure said cover to said casing, and a screw rotatably mounted in said cover and permanently attached thereto and adapted to engage said auxiliary cover and force said cover into locking engagement with said casing.

10. A grease cup having, in combination, a stationary member, a casing rotatably mounted upon said stationary member and provided with an opening at the upper end thereof, a cover rotatably mounted upon said casing, an auxiliary cover located within said cover, and a spring adapted to force said auxiliary cover against the upper end of said casing to close the opening therethrough.

11. A grease cup having, in combination, a stationary member, a casing rotatably mounted upon said stationary member and provided with an opening at the upper end thereof, a cover rotatably mounted upon said casing, an auxiliary cover located within said cover, a spring adapted to force said auxiliary cover against the upper end of said casing to close the opening therethrough, and a screw rotatably mounted in said cover and also adapted to force said auxiliary cover against said casing.

12. A grease cup having, in combination, a stationary member, a casing rotatably mounted upon said stationary member and provided with an opening at the upper end thereof, a cover rotatably mounted upon said casing, an auxiliary cover located within said cover, a spring adapted to force said auxiliary cover against the upper end of said casing to close the opening therethrough, a screw rotatably mounted in said cover and also adapted to force said auxiliary cover against said casing, and frictional means inserted between said cover and said screw and adapted to prevent the loosening of said screw.

13. A grease cup having, in combination, a stationary member, a casing rotatably mounted upon said stationary member and provided with an opening at the upper end thereof, a cover rotatably mounted upon said casing, an auxiliary cover located within said cover, said auxiliary cover embodying therein a plurality of disks with a layer of flexible material therebetween, and means to force said auxiliary cover against the upper end of said casing to close the opening therethrough.

14. A grease cup having, in combination, a stationary member, a casing rotatably mounted upon said stationary member and provided with an opening at the upper end thereof, a cover rotatably mounted upon said casing, an auxiliary cover located within said cover, said auxiliary cover embodying therein a plurality of metal disks having a layer of cork therebetween, and means to yieldingly force said auxiliary cover against the upper end of said casing to close the opening therethrough.

15. A grease cup having, in combination, a stationary member, a casing rotatably mounted upon said stationary member and provided with an opening at the upper end thereof, a cover rotatably mounted upon said casing, an auxiliary cover located within said cover, said auxiliary cover embodying therein a plurality of metal disks of different diameters having a layer of cork therebetween, said disks and layer of cork being riveted together, and means to yieldingly force said layer of cork into contact with the upper end of said casing to close the opening therethrough.

16. A grease cup having, in combination, a stationary member, a casing rotatably mounted upon said stationary member and provided with an opening at the upper end thereof, a cover rotatably mounted upon said casing, an auxiliary cover located within said cover, said auxiliary cover embodying therein a plurality of metal disks of different diameters having a layer of cork therebetween, said disks and layer of cork being riveted together, means to force said auxiliary cover into yielding engagement with the upper end of said casing, and means also to non-yieldingly force said auxiliary cover against the upper end of said casing to close the opening therethrough.

17. A grease cup having, in combination, a stationary member, a casing rotatably mounted upon said stationary member and provided with a circumferential groove adjacent to and parallel with the upper end thereof and a plurality of longitudinal grooves connecting the upper edge of said casing with said circumferential groove, a cover, and a plurality of pins attached to said cover and adapted to coöperate with said grooves to secure said cover to said casing.

18. A grease cup having, in combination, a stationary member, a casing rotatably mounted upon said stationary member and provided with a circumferential groove adjacent to and parallel with the upper end thereof, said casing also being provided with a plurality of longitudinal grooves connecting the upper edge of said casing with said circumferential groove and a plurality of recesses in the upper edge of said circumferential groove, a cover and a plurality of pins attached to said cover and adapted to coöperate with said grooves and said recesses to secure said cover to said casing.

19. A grease cup having, in combination, a stationary member, a casing rotatably mounted upon said stationary member and provided with a circumferential groove adjacent to and parallel with the upper end thereof, said casing also being provided with a plurality of longitudinal grooves connecting the upper edge of said casing with said circumferential groove and a plurality of recesses in the upper edge of said circumferential groove, a cover, an auxiliary cover located within said cover, a plurality of pins attached to said cover and adapted to coöperate with said grooves to secure said cover to said casing, and means to yieldingly force said auxiliary cover against the upper end of said casing and also force said pins into said recesses to prevent the rotation of said cover upon said casing.

20. A grease cup having, in combination, a stationary member, a casing rotatably mounted upon said stationary member and provided with a circumferential groove adjacent to and parallel with the upper end thereof, said casing also being provided with a plurality of longitudinal grooves connecting the upper edge of said casing with said circumferential groove and a plurality of recesses in the upper edge of said circumferential groove, a cover, an auxiliary cover located within said cover, a plurality of pins attached to said cover and adapted to coöperate with said grooves to secure said cover to said casing, means to yieldingly force said auxiliary cover against the upper end of said casing and also force said pins into said recesses to prevent the rotation of said cover upon said casing, and a screw located in said cover and adapted to engage said auxiliary cover and non-yieldingly force said auxiliary cover against said casing and thereby lock said cover to said casing.

21. A grease cup having, in combination, a stationary member, a casing rotatably mounted upon said stationary member and provided with an opening through each end thereof, the lower end of said casing being closed by said stationary member, means to limit the vertical movement of said casing on said stationary member in each direction, a cover rotatably mounted upon said casing, means to secure said cover to said casing, an auxiliary cover located in said cover and adapted to yieldingly engage the upper end of said casing, and means to positively force said auxiliary cover against said casing and thereby prevent the removal of said cover from said casing.

In testimony whereof I have hereunto set my hand in presence of two subscribing witnesses.

LESTER RAYMOND FOGG.

Witnesses:
 FRANKLIN E. LOW,
 CATHERINE M. JOYCE.